Patented Oct. 23, 1951

2,572,402

UNITED STATES PATENT OFFICE 2,572,402

ORGANO SILANES AND THEIR PRODUCTION

John Leopold Speier, Jr., Pittsburgh, Pa., assignor to Dow Corning Corporation, Midland, Mich., a corporation of Michigan No Drawing. Application March 17, 1948, Serial No. 15,491

2 Claims. (Cl. 260—448.2)

The present invention relates to organosilanes in which aliphatic ethers are substituents on the silicon atoms.

The chemistry of the organosilicon materials has been developing for a considerable period. In general, most of the silanes which have heretofore been produced, contain as the organic radicals, alkyl and aryl radicals. Such silanes have properties somewhat equivalent to the paraffins in the general field of organic chemistry. Particularly with respect to the inertness of the silanes.

Objects of the present invention are the provision of methods for the production of silanes which contain alkyloxy methyl substituents.

Silanes in accordance with the present invention are of the general type formula $(CH_3)_3SiCH_2OR$ in which R represents an alkyl radical. Typical compounds in accordance herewith are $(CH_3)_3SiCH_2OCH_3$ and $(CH_3)_3SiCH_2OC_{18}H_{37}$ These alkoxy methyl silanes are preferably produced by interacting chlorotrimethylsilane and a chloromethyl alkyl ether in liquid phase in the presence of metallic sodium.

An alternative method for the production of the ethers above indicated involves the interaction of chloromethyltrimethylsilane and an alkali metal alkoxide in liquid phase.

The silanes in accordance herewith have properties typical of aliphatic ethers. Thus, for example, they are excellent solvents for a wide range of materials.

Chlorotrimethylsilane which is employed in the process first above mentioned is a compound disclosed in the literature and available commercially. This compound is a liquid which boils at 57° C.

The chloromethyl alkyl ethers are well known materials which may be produced by the known reaction of the corresponding alcohol, formaldehyde, and hydrogen chloride as described by Farran, J. A. C. S. 47, 2421 (1925).

The reaction between chlorotrimethylsilane and the chloromethyl alkyl ether is obtained in the presence of elemental alkali metal at room temperature and above. At temperatures below the melting point of the alkali metal, mechanical difficulties are encountered in obtaining contact between the mixture of the reactants and the metal. These mechanical difficulties can, to some extent, be overcome by employing extremely finely divided alkali metal. A preferred operation is to conduct the reaction at a temperature above the melting point of the alkali metal. In this instance, suitable means are employed to maintain the reactants in the mixture due to the low boiling point of the chlorotrimethylsilane. Various specific methods, which may be employed, involve the use of either a pressure reactor or the use of a high boiling solvent such as toluene and reflux.

The chloromethyltrimethylsilane which is employed in the second method above mentioned is a material which is described in the literature. This may be produced by the chlorination of tetramethylsilane or by the chlorination of any methylchlorosilane and the reaction of the chlorinated product with the methyl Grignard reagent. The compound boils at 97° C.

The two reactants interact at a low rate at room temperature. The rate of reaction may be substantially increased by elevating the temperature in order to obtain rapid interaction. It is convenient to heat the reaction mixture under reflux for an extended period in order to obtain substantial completion of the reaction.

Example 1

26 gms. of sodium was dissolved in 400 ccs. of dry methanol. To the solution so prepared, 122.5 gms. of chloromethyltrimethylsilane were added, and the mixture was then refluxed for 24 hours. The product so obtained was distilled. A fraction boiling at 60° C. was obtained in amount of 165 ccs. which was an azeotropic mixture of trimethylsilylmethyl methyl ether and methanol. This azeotrope contained 64 per cent of the ether by volume. This fraction was washed with water to separate the ether from the methanol. A second fraction boiling at 61° C. contained this ether together with methanol and chloromethyltrimethylsilane. The ether was separated from this cut also. The total yield of the ether from the two cuts amounted to 114 ccs. The properties of the ether so obtained are as follows:

B. P. 83° C. at 740 mm.
$n_D^{25°}$ 1.3878
$D_4^{25°}$ 0.7576
Mol. wt. 116.4
Per cent C 50.51
Per cent H 11.82

Formula $(CH_3)_3SiCH_2OCH_3$

Example 2

80 gms. of chloromethyl methyl ether and 216 gms. of chlorotrimethylsilane were placed in an autoclave. 46 gms. of metallic sodium were added and the autoclave immediately closed. The autoclave was then heated to a temperature of 100° C. The temperature rose then to 155° C. without further heating. The autoclave was then cooled and the contents discharged. The product was filtered and the filtrate distilled. There was obtained by distillation a 26 per cent yield of the same ether described in Example 1. The unreacted chlorotrimethylsilane was recovered.

Example 3

One gm. mol of metallic sodium was added to an excess of absolute ethanol. To the sodium ethoxide solution so produced, chloromethyltrimethylsilane was added in the amount of one gm. mol. The mixture was refluxed for 24 hours and the reaction product filtered and distilled. By this distillation, a fraction was obtained in the amount of 25 ccs. which had a boiling point of 72° C. and was constituted of an azeotrope of chloromethyltrimethylsilane and ethanol containing some trimethylsilylmethyl ethyl ether and a second cut of 205 ccs. having a boiling point of 74° C. constituted of the indicated ether and ethanol. The fraction boiling at 72° C. was washed with water to remove the ethanol and was then extracted with cold concentrated sulphuric acid. The acid extract was washed with water to remove the acid. The acid soluble, extracted material was the desired trimethylsilylmethyl ethyl ether. The fraction boiling at 74° C. was washed with water and dried over calcium chloride. A 70 per cent yield of the desired ether was obtained. The properties are as follows:

B. P. 103° C. at 751 mm.
$n_D^{25°}$ 1.3911
$D_4^{25°}$ 0.755
Molecular wt. 131

Formula $(CH_3)_3SiCH_2OC_2H_5$

Example 4

50 gms. of sodium was added to 400 ccs. of toluene and the sodium then melted and dispersed by agitating the mixture. 50 gms. of chlorotrimethylsilane were then added. To this mixture there were added a mixture of 108.5 gms. of chloromethyl propyl ether and 100 gms. of chlorotrimethylsilane. The addition of this mixture was made at a rate to cause continuous reflux. After the addition, the reaction mixture was refluxed for an additional 1.5 hours, following which the flask was cooled and excess chlorotrimethylsilane was removed by distillation. Sodium chloride was filtered from the reaction mixture and the filtrate was distilled. By distillation a cut was obtained, boiling at 123° C. equal to 56 ccs. This product was the expected trimethylsilylmethyl propyl ether. The properties of this material are as follows:

B. P. 124° at atmospheric
$n_D^{25°}$ 1.3957
$D_4^{25°}$ .764
Molar refraction 45.89

Formula $(CH_3)_3SiCH_2OC_3H_7$

Example 5

1.13 gram moles of sodium was dissolved in dry n-butanol employing an excess of butanol over that necessary to react with the sodium. One gram mol of chloromethyltrimethylsilane was added to the reaction product and the mixture refluxed for 24 hours. The mixture was then filtered and distilled. In the distillation, the temperature was raised to 116° C. at which time solids were present in the residue. The residue was washed with water, dried and distillation continued. The desired trimethylsilylmethyl butyl ether was obtained in the amount of 36 ccs. at about 150° C. The properties are as follows:

B. P. 150° at 738 mm.
$n_D^{25°}$ 1.4038
$D_4^{25°}$ 0.774
Molar refraction 50.64

Formula $(CH_3)_3SiCH_2OC_4H_9$

That which is claimed is:

1. The method of preparing compounds of the type $(CH_3)_3SiCH_2OR$ in which R represents an alkyl radical which comprises interacting chlorotrimethylsilane, a chloromethyl alkyl ether and sodium by contacting the reagents in liquid phase with metallic sodium.

2. The method in accordance with claim 1 in which the sodium is in molten state.

JOHN LEOPOLD SPEIER, JR.

REFERENCES CITED

The following references are of record in the file of this patent:

Whitmore, "Jour. Am. Chem. Soc.," vol. 68 (1946) pages 481–484.

Goodwin, "Jour. Am. Chem. Soc.," vol. 69 (1947) page 2247.

Roedel, "Jour. Am. Chem. Soc.," vol. 71 (1949) pages 269–272.